United States Patent [19]

Spencer et al.

[11] Patent Number: 4,997,810
[45] Date of Patent: Mar. 5, 1991

[54] VIBRATORY CALCINATION OF INORGANIC OXIDE SUPERCONDUCTOR PRECURSOR POWDERS

[75] Inventors: Nicholas D. Spencer, Washington, D.C.; Jean W. Beeckman, Columbia, Md.

[73] Assignee: W. R. Grace & Co.-Conn., New York, N.Y.

[21] Appl. No.: 417,603

[22] Filed: Oct. 5, 1989

[51] Int. Cl.$^5$ .................. C01F 11/04; C01G 3/02; F27B 9/14; H01L 39/12

[52] U.S. Cl. .................. 505/1; 264/71; 423/592; 423/604; 423/617; 432/134; 501/123; 501/152; 505/725; 505/736; 505/742

[58] Field of Search ............ 23/313 R, 313 FB; 432/134; 505/1, 725, 736, 742; 423/604, 617, 592; 501/123, 152; 264/71

[56] References Cited

U.S. PATENT DOCUMENTS

| | | |
|---|---|---|
| 2,995,773 | 8/1961 | Gidlow et al. ............... 23/313 FB |
| 3,250,520 | 5/1966 | Corson et al. . |
| 3,262,217 | 7/1966 | Brown et al. ................. 432/134 |
| 3,643,932 | 2/1972 | Corson et al. . |
| 3,792,138 | 2/1974 | Lammers ..................... 264/71 |
| 3,960,772 | 6/1976 | Fort et al. . |
| 4,475,921 | 10/1984 | Barnatz ........................ 23/313 R |
| 4,804,649 | 2/1989 | Sherif .......................... 252/521 |
| 4,810,339 | 3/1989 | Heaven et al. ............... 505/1 |
| 4,859,652 | 8/1989 | Block ............................ 505/1 |
| 4,861,753 | 8/1989 | McCarron ..................... 252/521 |
| 4,880,771 | 11/1989 | Cava et al. .................... 501/1 |
| 4,886,777 | 12/1989 | Kimura et al. ................ 501/123 |
| 4,895,832 | 1/1990 | Chang et al. .................. 501/123 |
| 4,898,851 | 2/1990 | Michel .......................... 501/123 |

FOREIGN PATENT DOCUMENTS 0631438 4/1963 Japan ..................... 432/134

OTHER PUBLICATIONS

Bordia, "Sintering and Microstructure-Property Relations for YBa$_2$Cu$_3$O$_x$", Mat. Res. Soc. Symp. Proc., vol. 99, Nov./Dec. 1987, pp. 245–248.

Primary Examiner—Paul Lieberman
Assistant Examiner—John Boyd
Attorney, Agent, or Firm—Edward K. Cabic; Steven Capella

[57] ABSTRACT

An inorganic powder is vibrated while being calcined. The vibrations suspend the powder as in a conventional gas-fluidized system, without clumping, but without loss of fines. As applied to superconductor precursor powders, the treatment accelerates growth of the superconducting phase. The invention includes a novel furnace system for simultaneously heating and vibrating the powders.

11 Claims, 4 Drawing Sheets

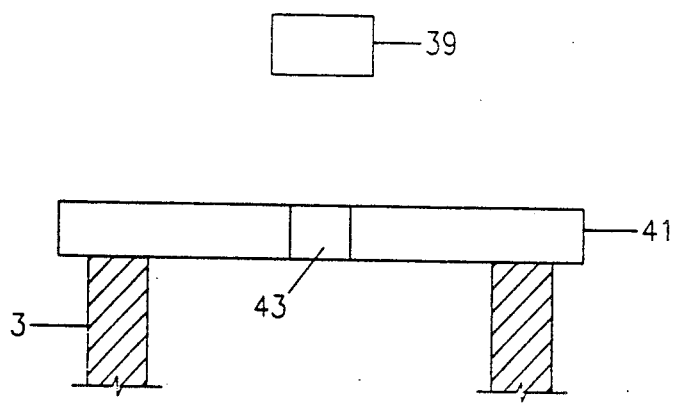
FIG.2
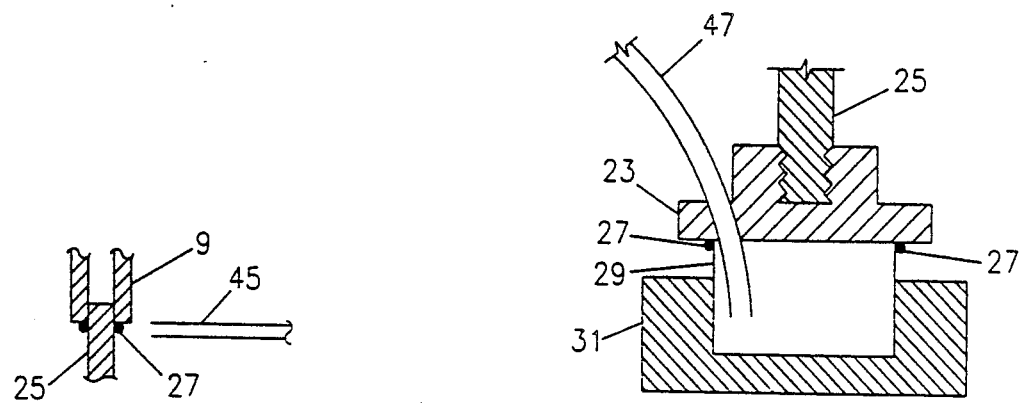
FIG.3
FIG.4
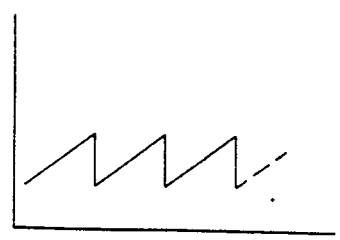
FIG.5

VIBRATORY CALCINATION OF INORGANIC OXIDE SUPERCONDUCTOR-PRECURSOR POWDERS

FIELD OF THE INVENTION

The invention relates to the calcination of inorganic powders.

BACKGROUND OF THE INVENTION

It is desirable to be able to calcine particulate inorganic materials to obtain certain specific results. For example, it may be necessary or desirable to calcine superconductor precursor powders at a temperature just below the onset of sintering, to avoid sintering the particles together into clumps. Such treatment converts the precursor powders into superconductor powders, which can be used directly in extrusion and similar operations without grinding. In this regard, it is known that holding a superconductor fragment at a certain high temperature tends to improve the purity of the superconducting phase and/or to increase the amount of superconducting phase.

It is difficult to calcine many inorganic powders without causing the powders to clump, a result that may require regrinding afterwards. Yet for many purposes it is desirable that the powders be calcined without clumping or agglomeration. For example, it may be desirable to calcine a powder in a controlled atmosphere (of nitrogen, air, oxygen, etc.) in the case that a component of the atmosphere needs to react chemically with the powder. Reaction is faster if the material remains in powder form throughout calcining because of the larger exposed external surface area. However, in such cases, thin beds may be required to get good gas-solid contact. The instant invention renders such measures unnecessary.

DESCRIPTION OF THE PRIOR ART

U.S. Pat. No. 3,250,520 discloses a vibrating limestone kiln, internally gas-fired. A reciprocating arm connected to a motor provides the vibration. The whole kiln is vibrated. Internal paddles move the limestone charge continuously along the kiln.

U S. Pat. No. 3,643,932 discloses a vibrating kiln similar to that in U.S. Pat. No. 3,250,520, except that the charge being advanced by vibration is a mixture of limestone powder and fuel oil.

U.S. Pat. No. 3,960,772 discloses a vibrating column of alumina paste "crumbs" suspended in mineral oil at 45° C. Vibration is provided by an ultrasonic generator at 40,000 Hz, and serves to convert the crumbs into spheres.

We are not aware of prior art suggesting heating a ceramic powder in a system comprising a carrier crucible in a furnace, where the crucible is vibrated but not the furnace.

SUMMARY OF THE INVENTION

Our invention is directed to a process for suspending inorganic particles in a "fluidized" state in a furnace by means of vibratory motion imparted to the particles. Our process can use finer particles than ordinarily possible, and the heat treatment generally converts the particles to the expected forms (chemical and/or physical) without clumping and in a shorter time than in comparable conventional calcination processes. Practically any inorganic powder can be treated by the invention process. Prominent among such materials are metal precursors, including metal oxides. Thus, very finely powdered metal oxides such as NiO and $Fe_3O_4$ can be reduced to elemental metal powder with flowing hydrogen. Ceramics are a particularly useful charge material. In a preferred embodiment the particles are superconductor powders, heated to a high temperature, without sintering, or clumping so that they remain as powders throughout the heating cycle. Such treatment further crystallizes the superconducting phase in the powder grains. Our process converts precursor powders to high purity superconductors within five hours, a fraction of the time normally required to convert a precursor powder to a similarly pure superconductor.

The invention includes novel vibratory furnace means for carrying out the process.

With respect to superconductors, our invention may be considered an improvement in known schedules for calcining superconductor precursor powders, in which the improvement comprises vibrating the powder during calcination. In this regard, the process (and resulting superconductor products) is not limited to the vibratory furnace described in FIGS. 1-5. Other vibrational systems can be used with such superconducting precursor powders.

We use "ceramic" in the conventional sense, i.e., nonmetallic materials transformed or transformable by high temperature. These materials are generally oxides or precursor materials (e.g., hydroxides, carbonates, etc.) that when heated, convert to oxides, silicates, etc., or to a different crystalline structure. Powders of substantially any such precursor, or mixtures of such materials, can be treated by the invention process. Such materials include oxides of lithium, potassium, beryllium, strontium, barium, scandium, yttrium, the rare earths, titanium, vanadium, chromium, iron, cobalt, nickel, copper, zinc, cadmium, aluminum, tin, lead, antimony, bismuth, etc., and their mixtures.

By "powder" we mean particulate material. There is no minimum particle size. It is a special advantage of our process that it can handle extremely fine powders that would be blown away in a normal gas fluidization process. Particle size can vary, for example, within the range of about 0.1 micron to 3 mm and larger.

OBJECTS

It is an object of the invention to calcine an inorganic powder under controlled conditions of agitation without loss of fines.

A further object is to calcine an inorganic powder for prolonged heating times to cause physical and/or chemical changes within the particles but without causing the particles to clump or agglomerate.

Another object is to heat a superconductor precursor powder to convert it into a superconductor powder at a fraction of the heat time conventionally required.

Another object is to provide a furnace apparatus for simultaneously vibrating and calcining a particulate ceramic material but without vibration of the furnace.

Another object is to provide a vibratory furnace system with a vibratory frequency pattern that can be selected based on the properties of the powder.

BRIEF DESCRIPTION OF THE DRAWINGS

FIG. 2 shows an alternate arrangement of the top of the furnace of FIG. 1, providing for periscopic viewing of the course of the calcination.

FIG. 3 shows in enlarged fragmentary section part of FIG. 1 showing air cooling the juncture of certain elements of the vibratory linkage.

FIG. 4 shows in enlarged fragmentary section part of FIG. 1 showing air cooling the vibratory means.

FIG. 5 shows a preferred wave curve, with coordinates of frequency versus time, for varying the frequencies of the vibration source, generated by the function generator of FIG. 1.

DESCRIPTION OF THE PREFERRED EMBODIMENTS

As will now be described in detail, our novel vibratory apparatus comprises four major elements: (1) the furnace proper; (2) a powder-carrying crucible without mechanical linkage to the furnace; (3) vibrator; and (4) the linkage between the carrier crucible and the vibrator.

Figure 1:
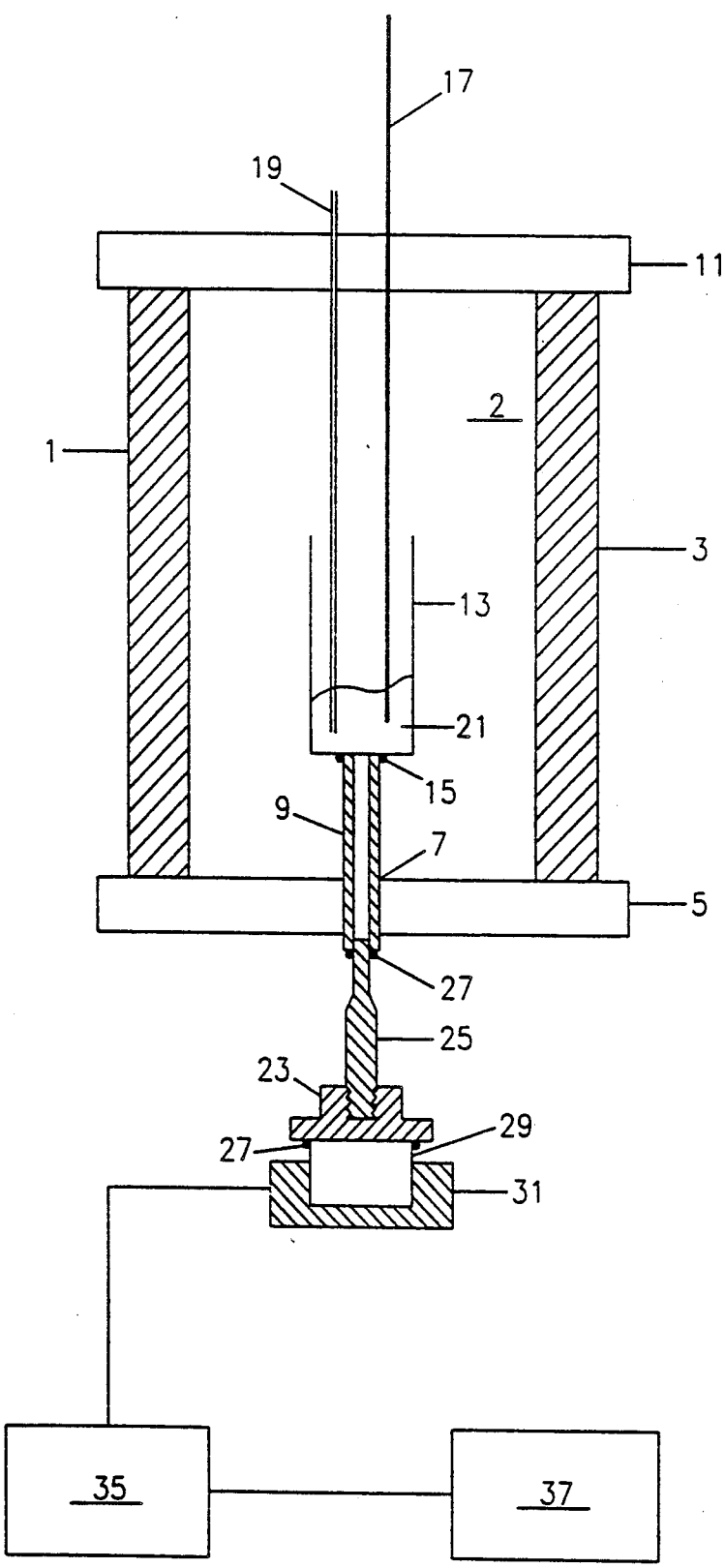
FIG. 1 is an elevational view in section of a furnace assembled in accordance with the invention, with furnace proper, vibratory means, and means linking appropriate furnace elements with the vibratory means.

Referring now to FIG. 1, at 1 is shown the furnace generally, with chamber 2, walls 3, floor 5, hole 7 in the floor 5, and lid or roof 11. The furnace is heated by electrical resistance elements (not shown) and is designed to achieve temperatures of at least 1000° C. Within the furnace is carrier crucible 13, to the bottom of which is attached alumina tube 9 by means of a fired soda glass seal 15. The lower end of tube 9 is joined to connecting leg 25 with epoxy adhesive 27. Inconel thermocouple 17 and alumina gas feed tube 19 are disposed in powder charge 21 in crucible 13.

Support ring 23 is adhered to voice coil 29 with epoxy adhesive 27 and connecting leg 25 is screw-fitted into said ring 23. Voice coil 29 is disposed within speaker magnet 31, from which the speaker cone has been removed. 35 represents an audio amplifier and 37 a function generator.

FIG. 2 shows a modification in the furnace. 39 is a mirror positioned (by means not shown) to give a view of the surface of the powder in crucible 13 through a slot 43 in removable lid 41.

FIG. 3 shows an air hose 45 positioned to supply cooling air to the joint of alumina tube 9 and connecting leg 25.

FIG. 4 shows an air hose 47 positioned to supply cooling air to voice coil 29.

A notable feature of the apparatus is that, within the furnace, only the carrier crucible 13, powder 21, seal 15, and tube 9 are vibrated. The walls 3 and floor 5 receive no vibration. This prevents vibrational damage to the furnace as well as eases the load on the voice coil 29.

Our vibration source permits a degree of control that is difficult or impossible to attain with other vibrational systems: we can modulate the frequency in accordance with a predetermined pattern. This ability is particularly useful in cases where the powdered charge tends to form nodes or standing waves when vibrated at a fixed frequency. Such nodes tend to segregate regions of particles and thus interfere with rapid mixing. (The tendency of a given powder to behave in this way can be readily determined by observing its behavior with a fixed frequency with the furnace shell removed.) However, with our apparatus nodes are readily avoided by using a "saw-tooth" frequency modulation pattern such as that shown in FIG. 5, e.g., with frequency rising from 100 Hz to 150 Hz then instantly dropping back to 100 Hz every two seconds. This pattern causes a chaotic behavior in crucible 13 that effectively breaks up and/or prevents nodes and standing waves in the powder.

A vibration frequency in the range of about 10–5000 Hz is generally useful. Within this range, certain frequencies may be found to give optimum suspension for specific powders. We greatly prefer vertical (up-and-down) vibrations; however, the vibrations resulting in the inorganic powder charge are chaotic in all directions.

The materials used in the furnace system can vary considerably. For example, the carrier crucible 13 as well as the tube 9 can be a refractory material other than alumina, e.g., zirconia, yttrium barium cuprate, etc. The support ring 23 and connecting leg 25 were formed of polymethylmethacrylate in the apparatus as actually constructed, but alternate materials are suitable, e.g., polytetrafluorethylene, etc. Further, these two latter elements need not be plastic at all, but may be ceramic or metal, provided they are light weight and/or the voice coil can carry the load.

The furnace can be modified in various ways within the skill of the art, while remaining within the scope, spirit, and concept of the invention. For example, it can be assembled for continuous operation. In this modification, a feed tube can continuously introduce feed powder into carrier 13, and a dip tube can be inserted in the carrier to exit overflow materials through the furnace floor 5.

The following examples illustrate without limiting the invention.

EXAMPLE 1

A superconductor precursor powder was prepared by the process described in U.S. Ser. No. 095,083 filed Sept. 11, 1987. Namely, an aqueous solution of the nitrates of Y, Ba, and Cu was reacted with aqueous tetraethylammonium carbonate while maintaining the pH of the reaction mixture at about 9 by dropwise addition of tetraethylammonium hydroxide to the reaction mixture, thereby precipitating mixed hydroxide/carbonates of Y, Ba, and Cu. The quantities of nitrates were selected so as to provide atomic ratios of $Y_1Ba_2Cu_3$ in the final hydroxide/carbonate mixture. These ratios will make a superconductor when the precipitated product is calcined in oxygen. The carbonate precipitate was collected, dried, broken up into a powder, and heated for 5 hours at 540° C. in order to burn out any organic material.

The powder (16 g), about −100 mesh, was placed in the alumina carrier crucible of the furnace, and the thermocouple 17 was inserted in the powder together with the oxygen tube 19.

The vibrator and the furnace were turned on. Oxygen was fed through tube 19 at 50 cc/hr. The thermocouple recorded a temperature of 900° C. in 1½ hours. The furnace was maintained at this temperature for 9 hours, after which time it was cooled to 800° C. in 15 minutes and then slowly cooled to 400° C. over 6 hours to permit oxygenation. The furnace was then turned off and allowed to cool to room temperature. Vibration was maintained throughout. The powder was examined by x-ray diffraction and determined to have the known $YBa_2Cu_3$ oxide superconducting crystal structure. X-ray diffraction patterns are given as A and A' in FIGS. 6 and 7, and are discussed further in those Figures.

EXAMPLE 2 (Control)

Example 1 was repeated, but without vibration. The powder was examined by x-ray diffraction and determined to have the known $YBa_2Cu_3$ oxide superconducting crystal structure, but with amounts of residual unreacted CuO and $BaCO_3$ not found in the Example 1 product. X-ray diffraction patterns for Example 2 are given as B and B' in FIGS. 6 and 7, and are discussed further in those Figures as follows.

Figure 6:
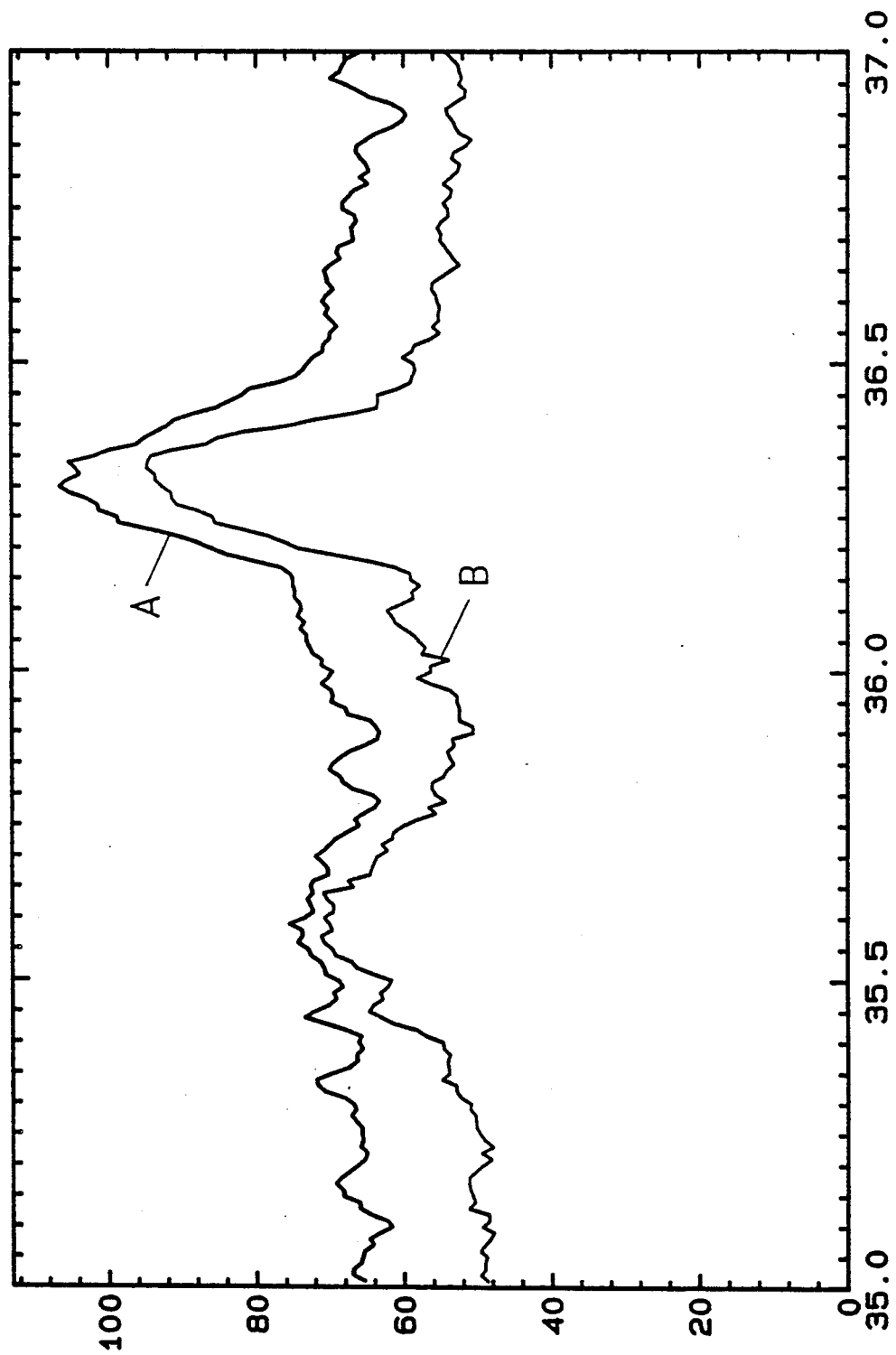
FIGS. 6 and 7 show x-ray diffraction patterns for Y-Ba-Cu oxide powders calcined during vibration (A,A') compared with patterns (B,B') of powders similarly processed but without vibration. The curves in FIG. 6 were smoothed for purposes of clarity. "Rel. Int." means relative intensity. "Non-vibro" and "vibro" refer to non-vibration and vibration. Yttria is not shown because it is amorphous and does not make an x-ray diffraction pattern.

FIG. 6 shows the region between 35.0 and 37.0 degrees 2-theta and includes a peak at 36.3 attributable to $YBa_2Cu_3O_7$ - the desired finished product - and a peak around 35.6 attributable to CuO (a component of the starting material). In pattern A in FIG. 6 (the invention) the amount of CuO is about 0.1 wt. % and in B (control) the amount of CuO is about 0.9 wt. %. The amount of residual unreacted CuO in the control product is thus greater by almost an order of magnitude.

Figure 7:
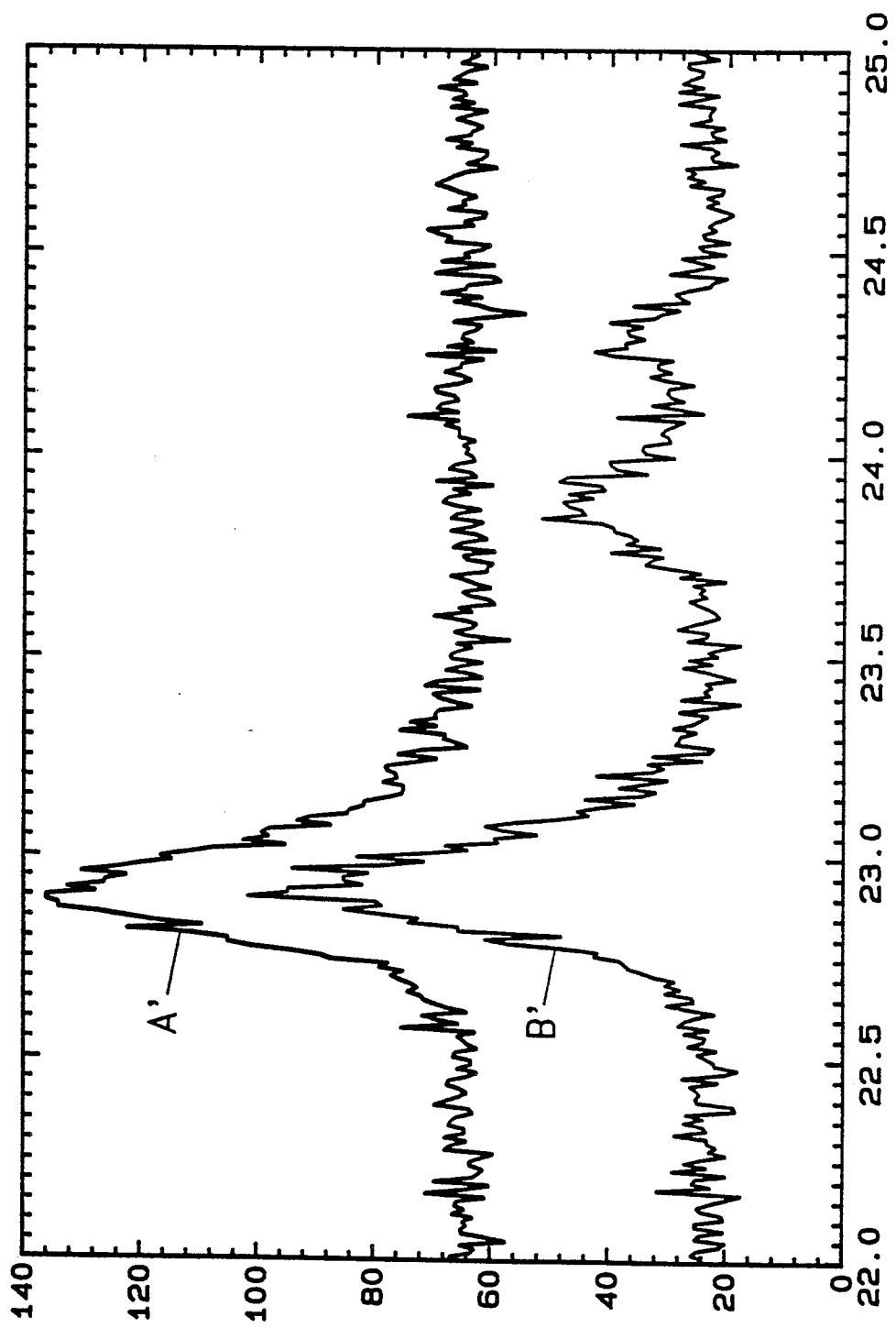

FIG. 7 shows x-ray diffraction patterns in the region 22.0–25.0 degrees 2-theta. A $YBa_2Cu_3O_7$ peak shows at about 22.9 degrees, in both A' (the invention) and B' (the control). The point of interest in this comparison is in B', the peaks at about 23.8 and about 24.3 degrees, indicating the presence of about 1 wt. % $BaCO_3$ in B', the control, but none in A', the invention.

Measurements of the a.c. diamagnetic susceptibility for the product of Example 1 showed it to have a superconducting fraction 6 times higher than that of Example 2, at 12K.

EXAMPLE 3

In a run similar to that of Example 1, the powder (13 g), about −100 mesh, after heating for 5 hours at 540° C., was placed in the alumina carrier crucible of the furnace, the thermocouple 17 was inserted in the powder together with the oxygen-tube 19.

The vibrator and the furnace were turned on. Oxygen was fed through tube 19 at 50 cc/hr. The thermocouple recorded a temperature of 950° C. in 1½ hours. The furnace was maintained at this temperature for 5 hours, after which time it was turned off, and the powder was allowed to cool, while continuing the vibration.

The powder was examined by x-ray diffraction and determined to have the known $Y_1Ba_2Cu_3$ oxide superconducting crystal structure. Thus, our process was able to make a superconducting powder by heating for only 5 hours, whereas conventionally 15 hours or more is required at 950° C, starting from the same powder.

Although this was not done, it was evidently possible to mix the powder with polyolefin and plasticizer in the known way and to extrude the mixture as monofilament or tape.

In a comparison run, without vibration, the powder fused into clumps. In another run, where the powder was heated in a fluidized nitrogen bed, fines were quickly lost in the upflow.

EXAMPLE 4

A superconductor precursor powder is prepared by the process described in U.S. Ser. No. 095,083, aforesaid. Namely, an aqueous solution of nitrates of Bi, Pb, Sr, Ca, and Cu is reacted with aqueous tetraethylammonium carbonate while maintaining the pH at about 8 by dropwise addition of tetraethylammonium hydroxide to the reaction mixture, thereby precipitating mixed hydroxide/carbonates. The quantities of nitrates are selected so as to provide atomic ratios of $Bi_{1.8}Pb_{0.2}Sr_2Ca_1Cu_2$ in the precipitate. (These ratios will make a superconductor when the precipitated product is calcined in air.) The precipitate is collected, dried, and broken up into a powder. 8 g of the powder is placed in alumina crucible 13 of FIG. 1 and calcination is carried out for 5 hours with vibration as in Example 1, except that the temperature is 820° C. and air, not oxygen, is used in the gas inlet tube. The resulting powder is superconducting.

A number of superconductor precursor powders can be treated by the process of our invention. Such powders can be made as described, e.g., in U.S. Pat. Nos. 4,804,649 and 4,839,339, and as described in the literature, e.g., "Preparation of High Tc-Y-Ba-Cu-O Superconductor Using Colloidal Methods: - Fujiki et al. - July 1987, Japanese Jour. of Applied Physics, pp. 1159–1160. Also, as indicated the inorganic powder to be treated can be other than a superconductor precursor.

EXAMPLE 5

7 g. freshly precipitated finely powdered alumina is dried, placed in the crucible as in Example 1 (the gas tube 19 is no used), and heated at 1200° C. with vibration for 2 hours for conversion to alpha-alumina without clumping. The convention calcination to alpha-alumina results in clumping and requires regrinding.

What is claimed is:

1. Process comprising calcining a superconductor oxide precursor powder in a heating zone while vibrating the powder but not the heating zone wherein the vibration is in the frequency range of about 10–5000 Hz.

2. Process according to claim 1 wherein the powder particles are in the range of about 0.1 microns to 3 mm.

3. Process according to claim 1 wherein the precursor is $Y_1Ba_2Cu_3$ hydroxide/carbonate, held at a temperature of about 890° C. for about 9 hours.

4. Process according to claim 1 wherein the powder passes a 100-mesh screen.

5. Process according to claim 1 wherein the precursor is $Bi_{1.8}Pb_{0.2}Sr_1Ca_2Cu_2$ hydroxide/carbonate, held at a temperature of about 820° C. for about 5 hours.

6. Process according to claim 1 wherein the vibration varies in frequency from 100 Hz to 150 Hz over a two-second cycle in a saw-tooth wave pattern.

7. Process according to claim 1 wherein a gas is fed to the powder during calcination.

8. Process according to claim 7 wherein the gas is oxygen.

9. Process according to claim 1 wherein the powder is heated for a time and temperature sufficient to further crystallize the superconducting phase in the powder particles.

10. In the process of calcining an oxide superconductor precursor powder to convert same to a superconductor, the improvement comprising vibrating the powder during calcination wherein the vibration is in the frequency range of about 10–5000 Hz.

11. Process according to claim 10 wherein the superconductor precursor powder comprises Y, Ba, and Cu.

* * * * *